Sept. 24, 1968 R. D. LA PAN 3,402,481
DRIERS AND COMPONENTS THEREOF
Filed Sept. 24, 1965 16 Sheets-Sheet 1
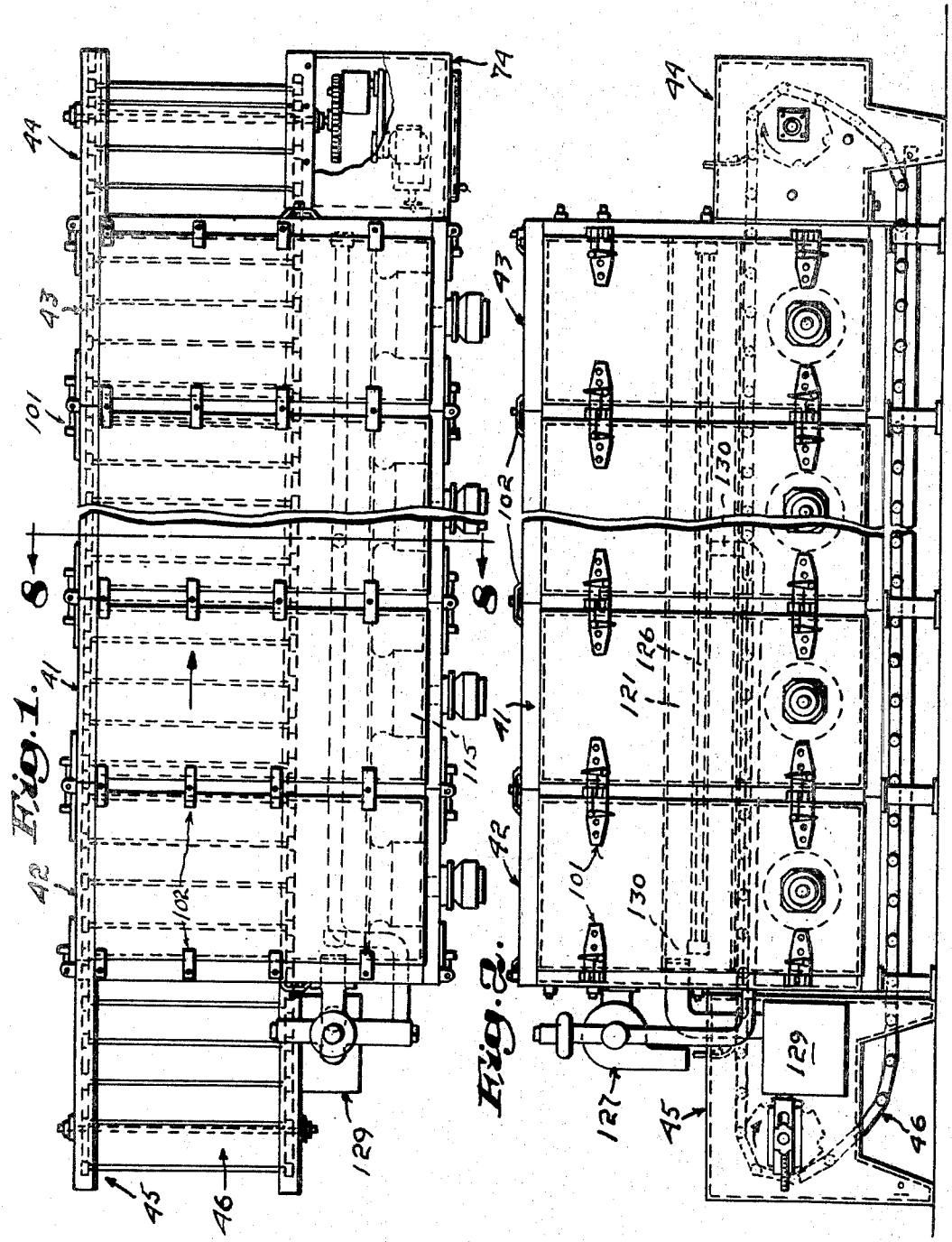
Inventor:
Raymond D. LaPan,
by Abbott Spear
Attorney

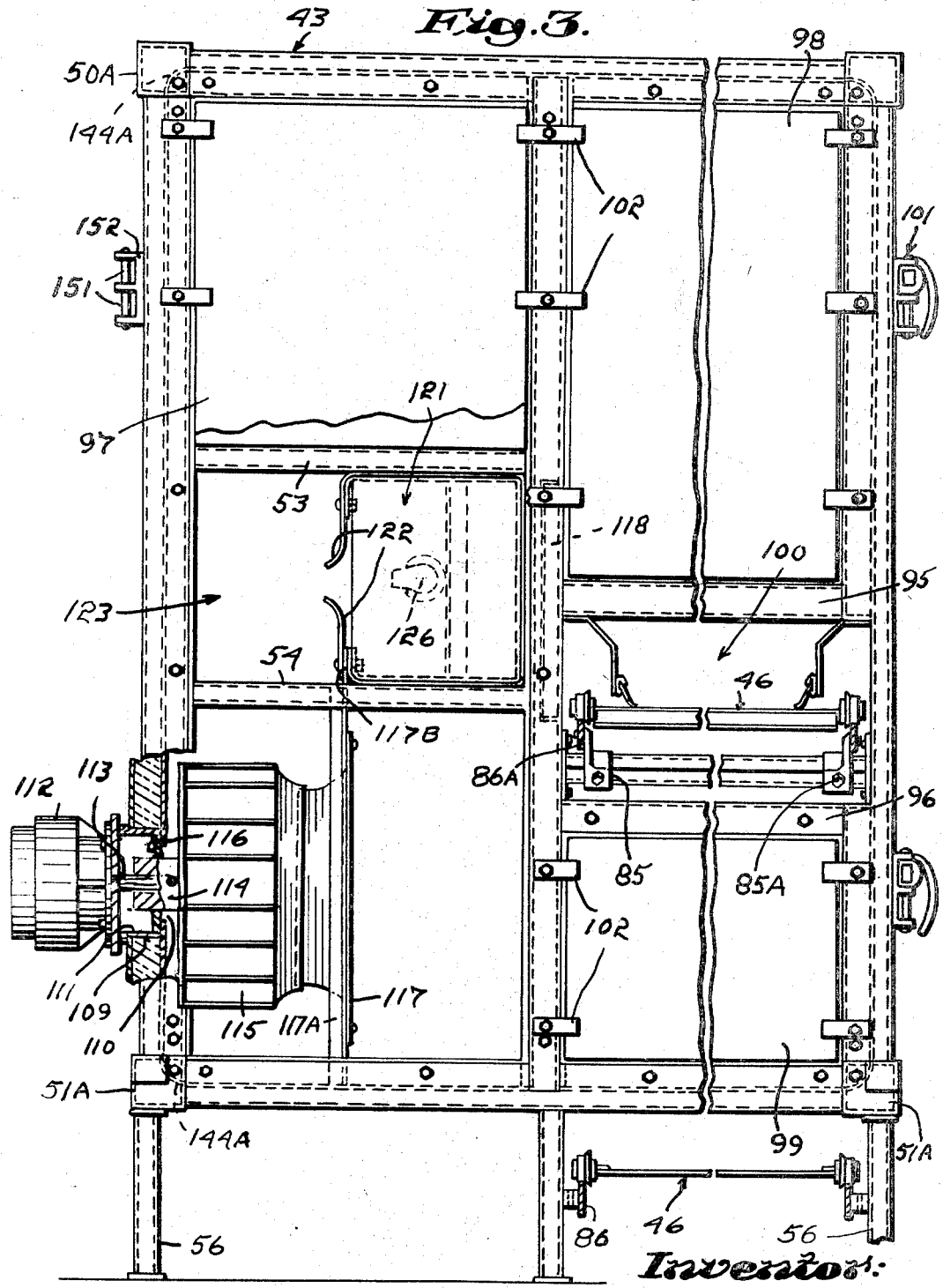

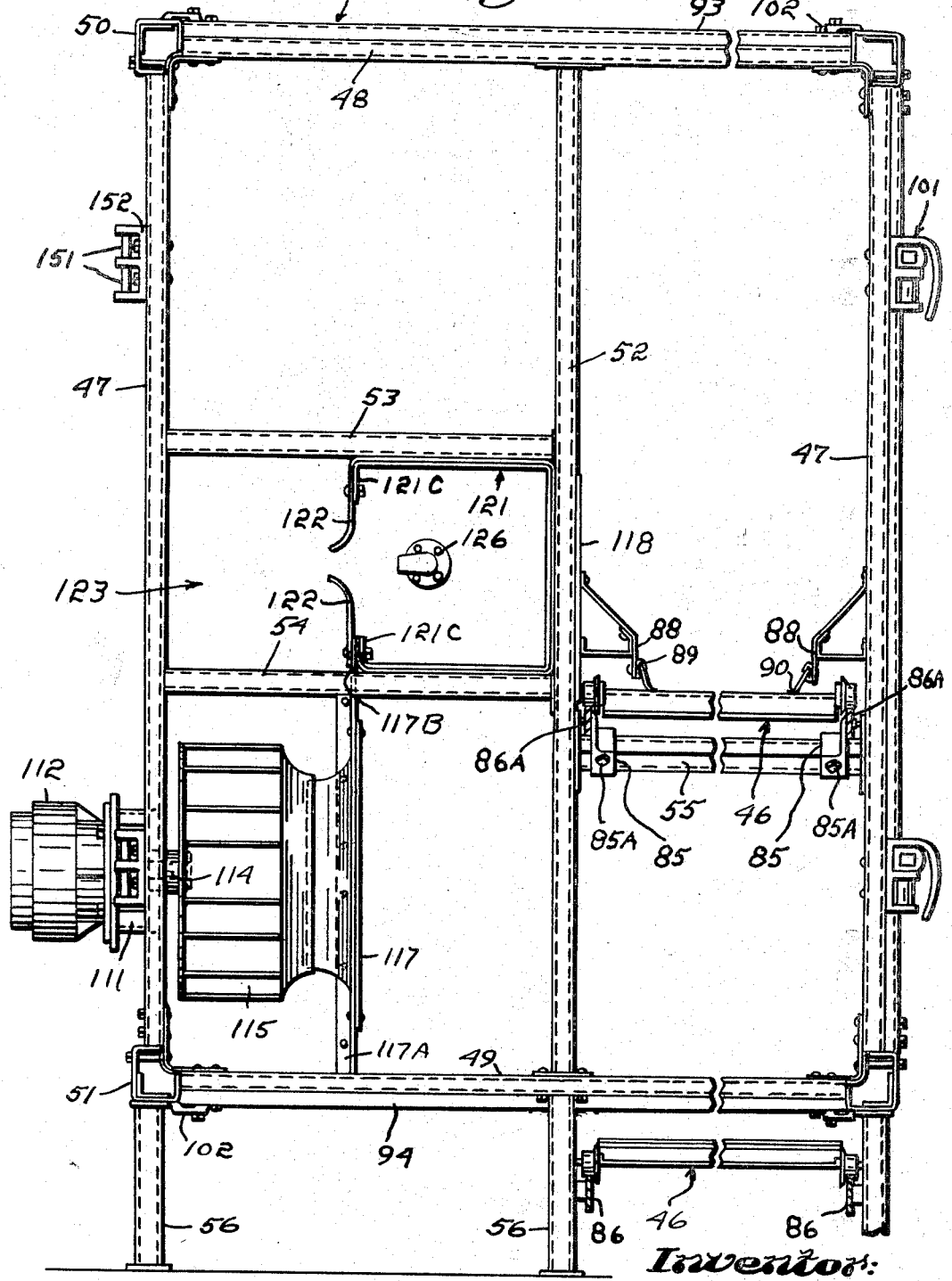

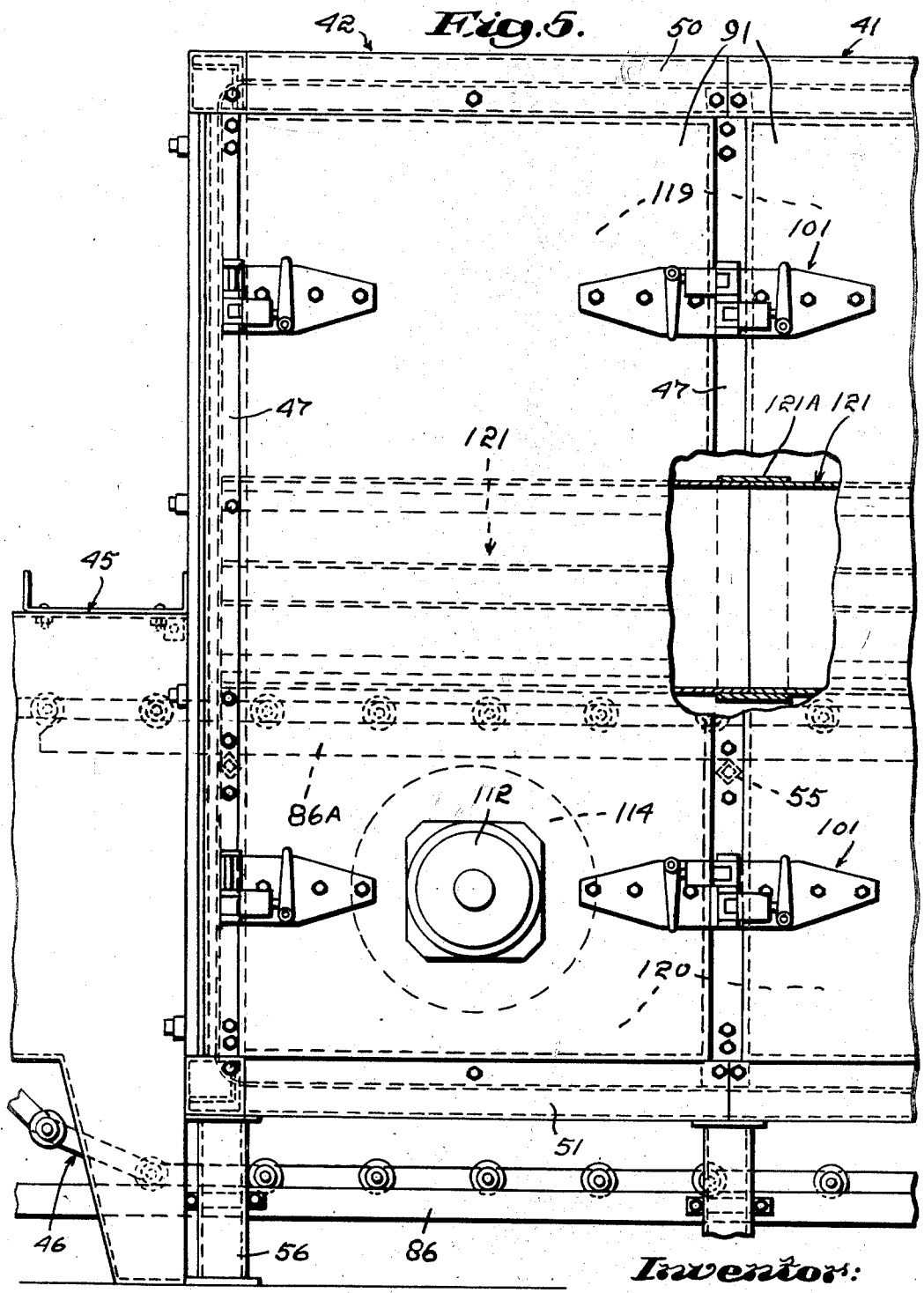

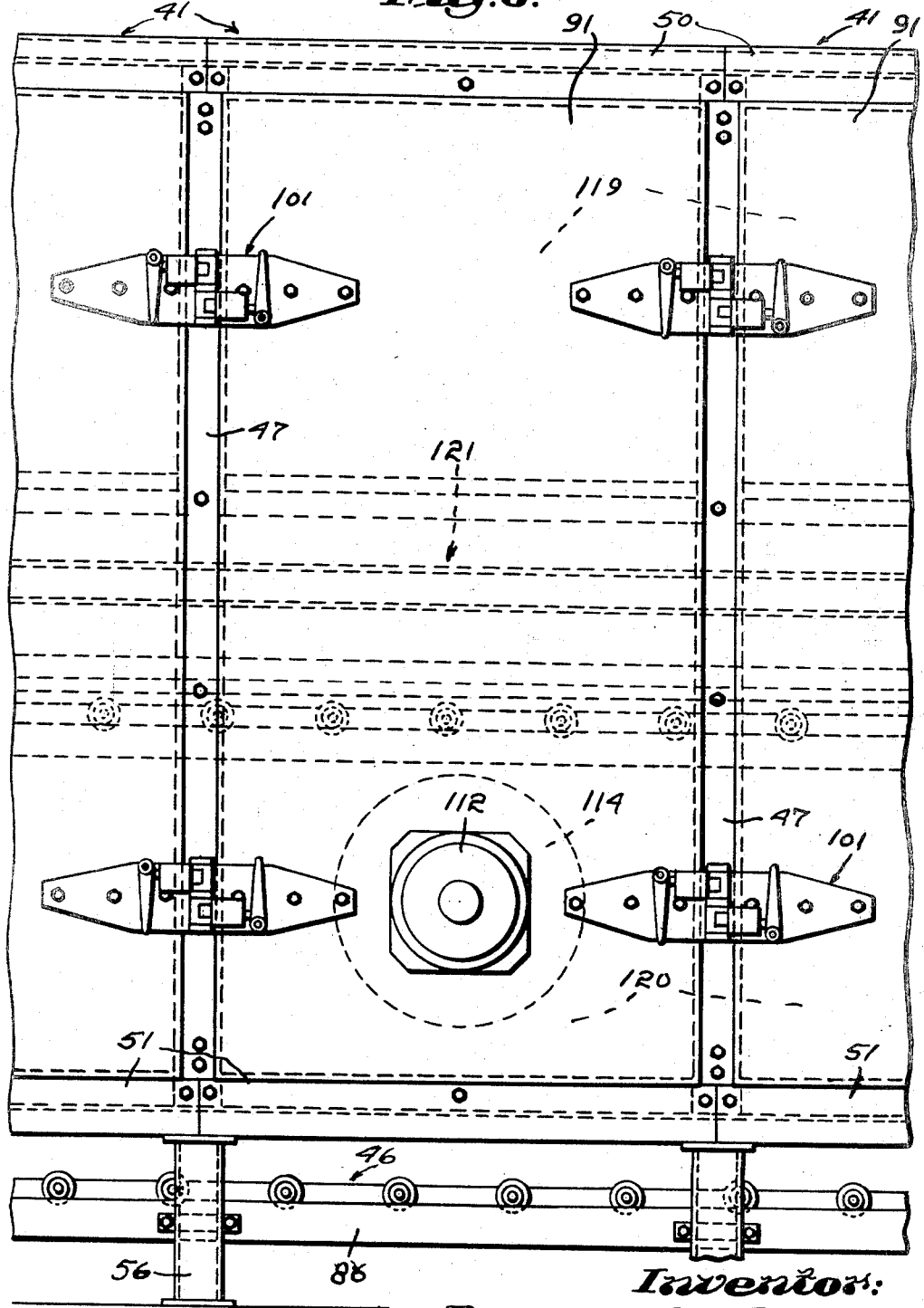

Sept. 24, 1968    R. D. LA PAN    3,402,481
DRIERS AND COMPONENTS THEREOF
Filed Sept. 24, 1965    16 Sheets-Sheet 6

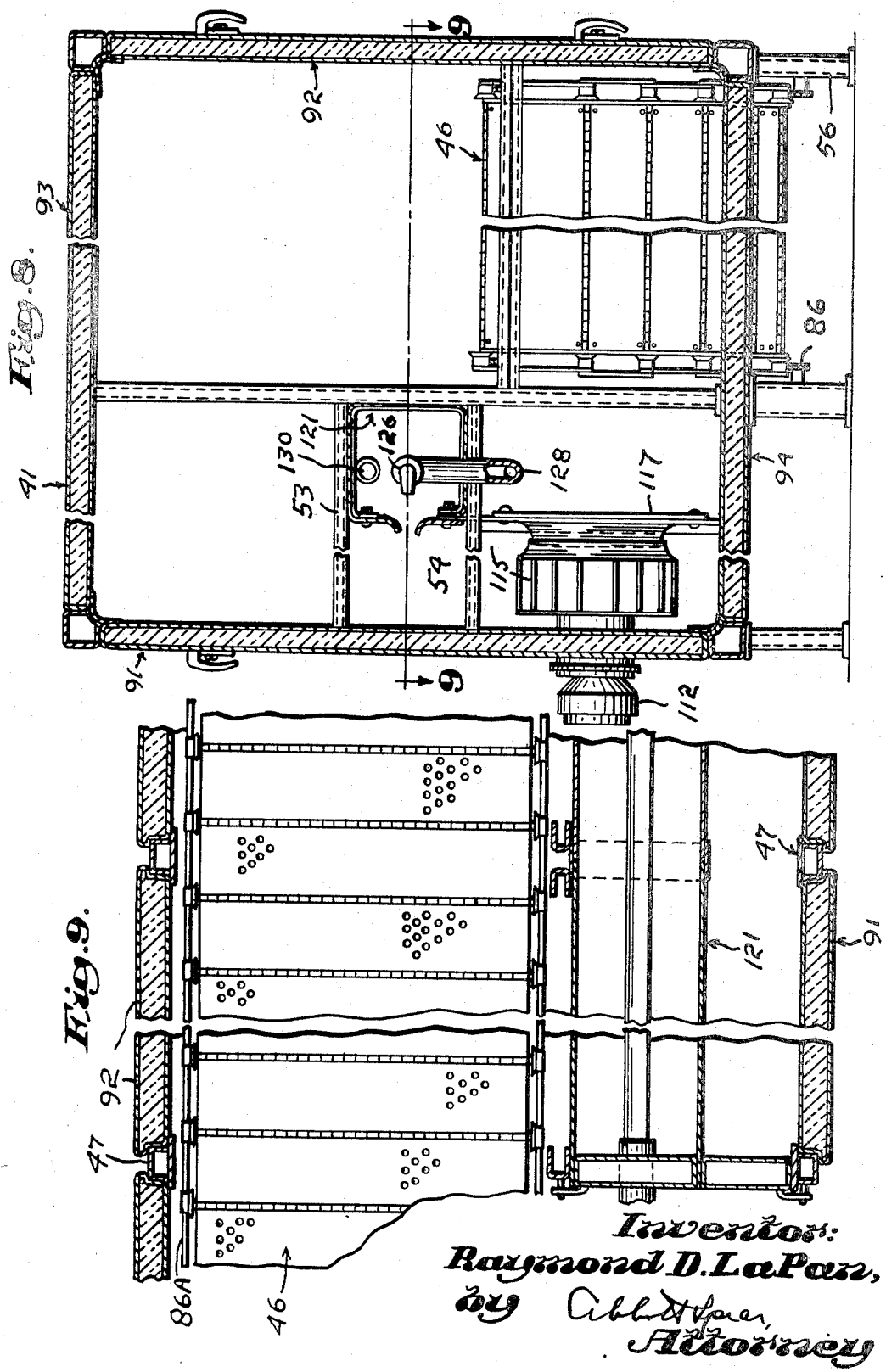

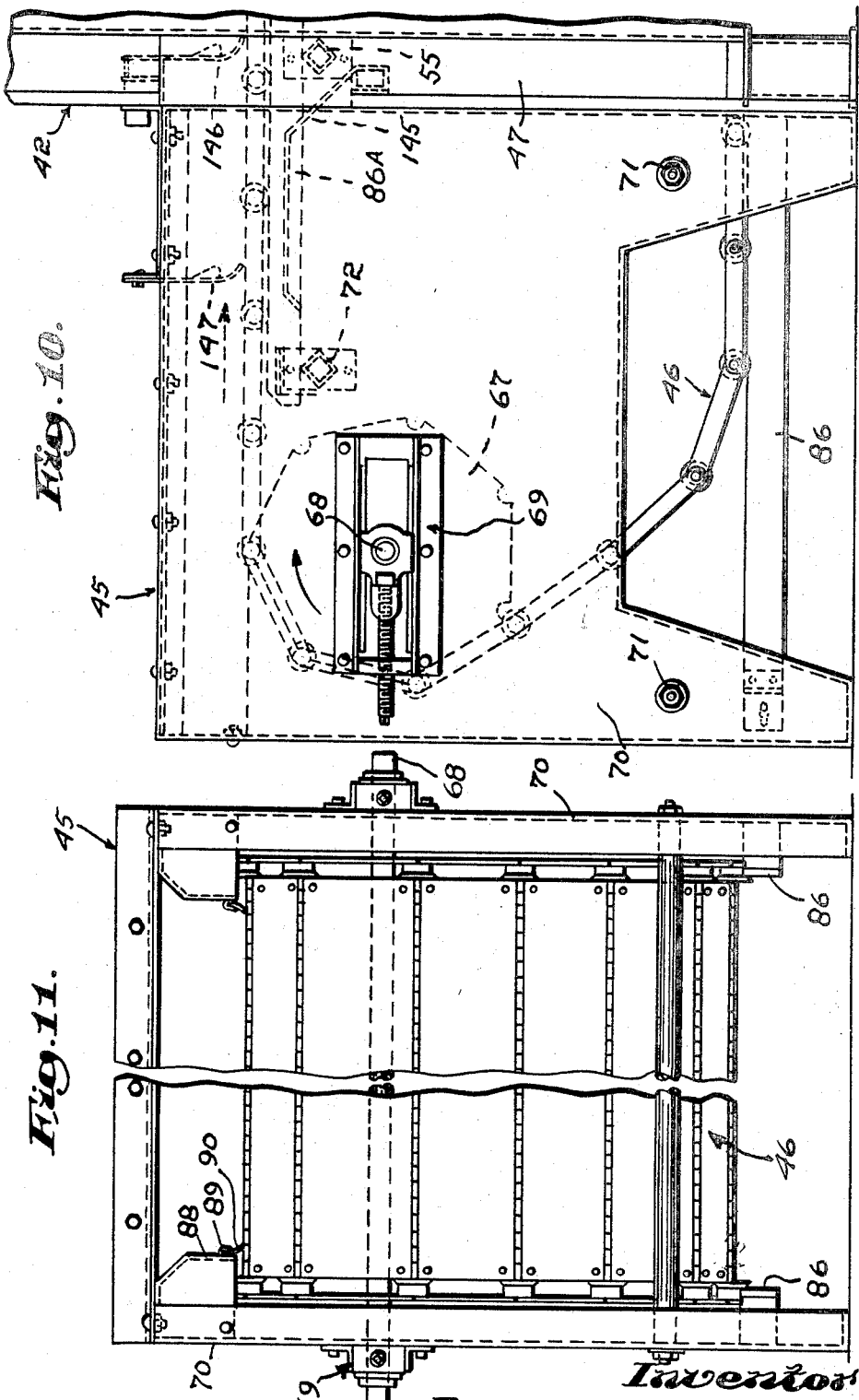

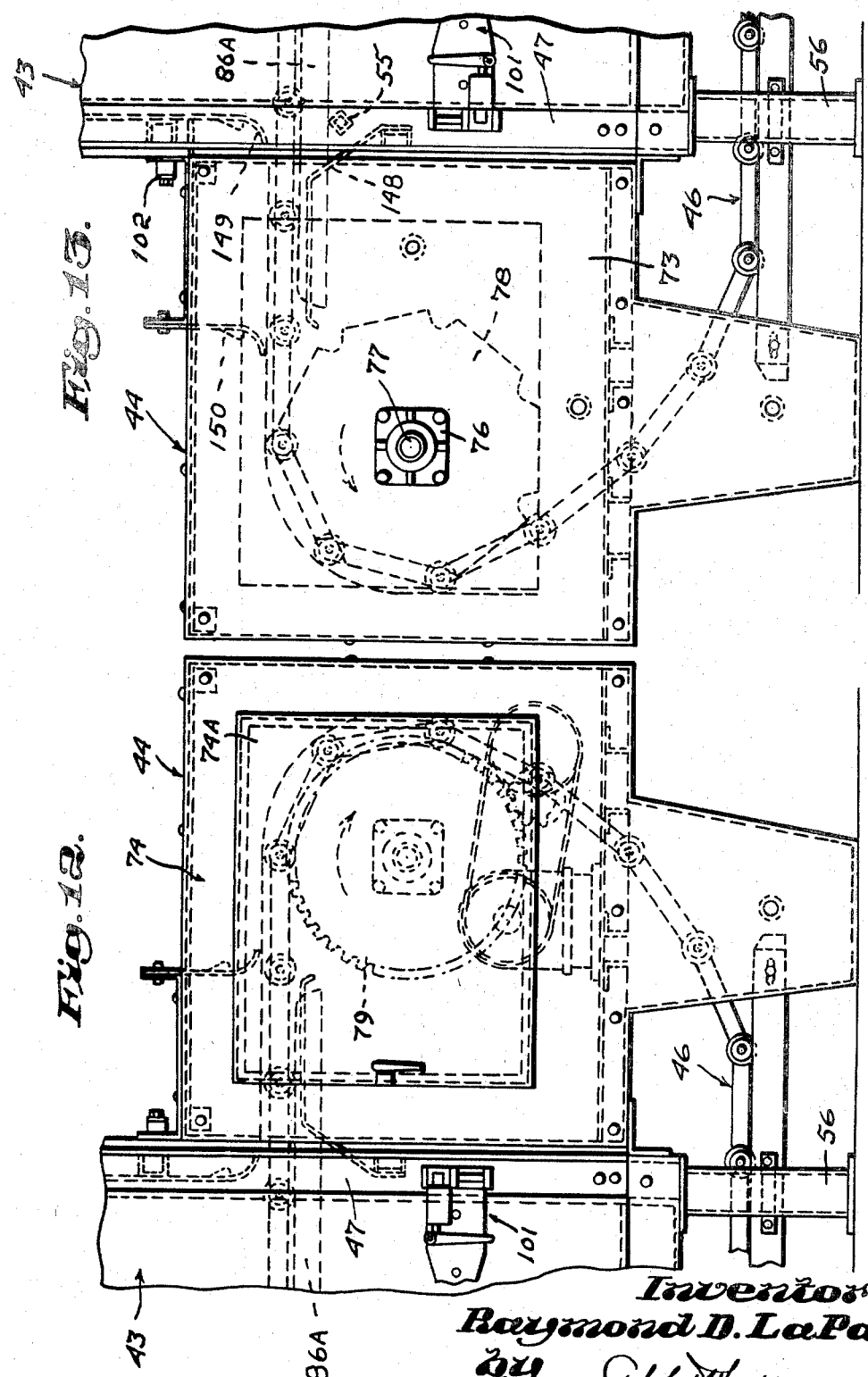

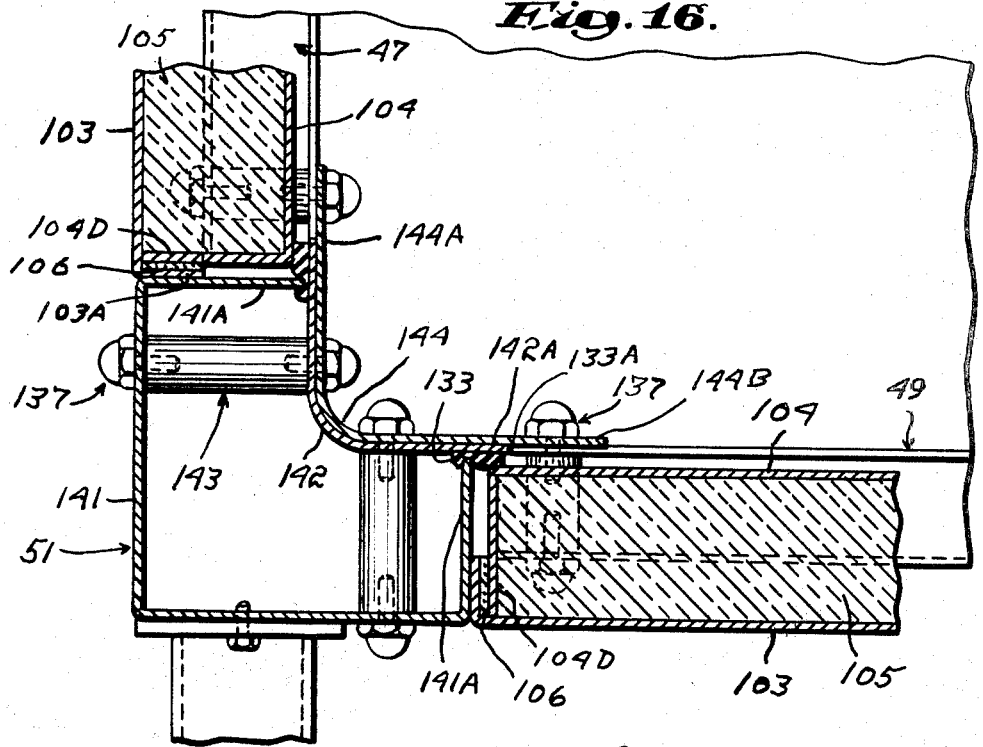
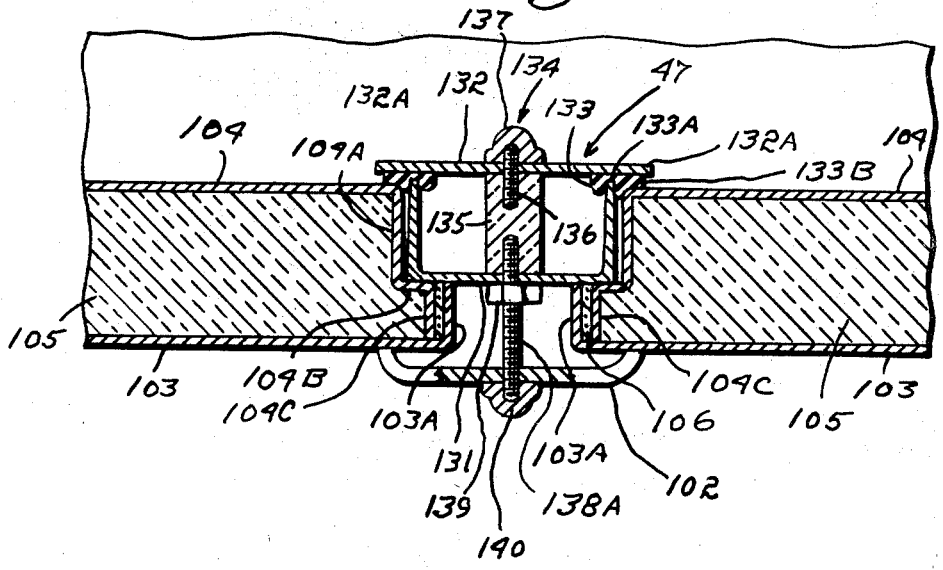

Sept. 24, 1968   R. D. LA PAN   3,402,481
DRIERS AND COMPONENTS THEREOF
Filed Sept. 24, 1965   16 Sheets-Sheet 12
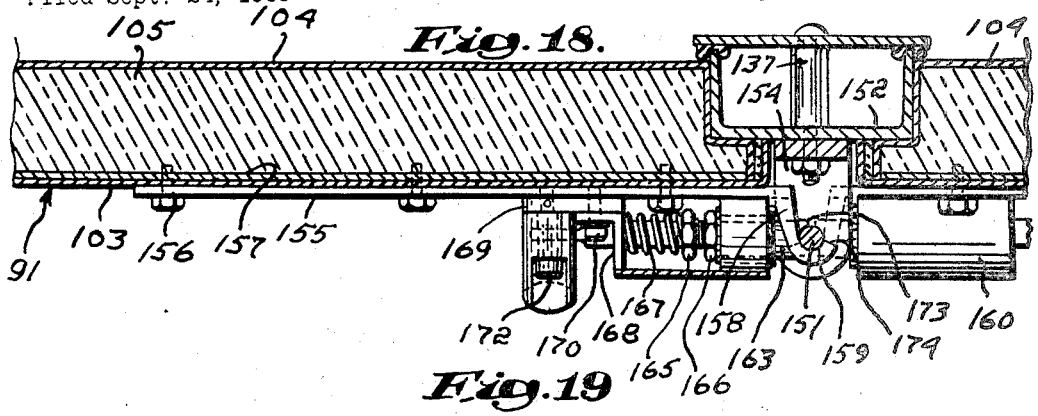
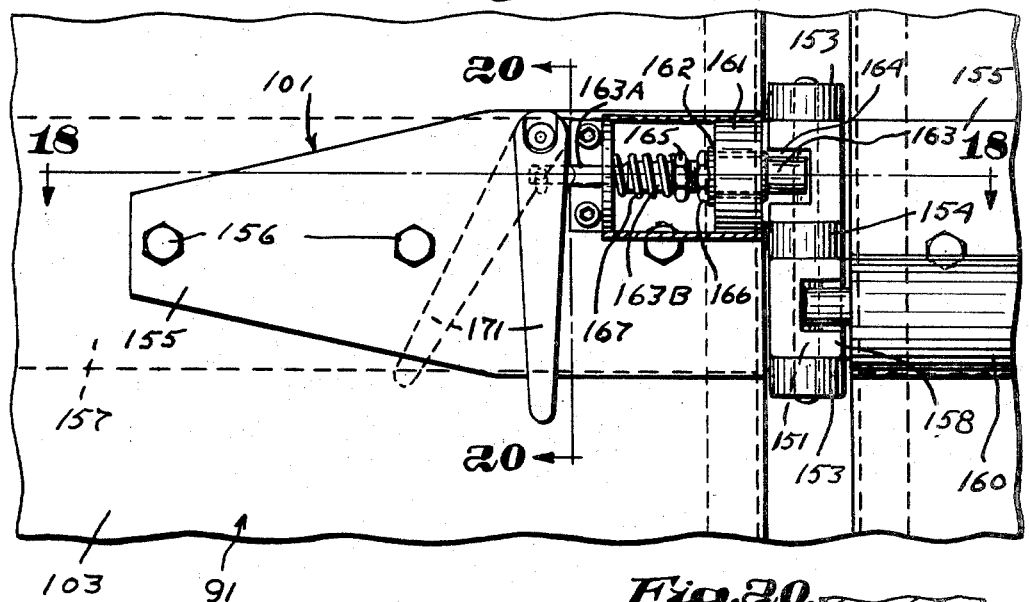
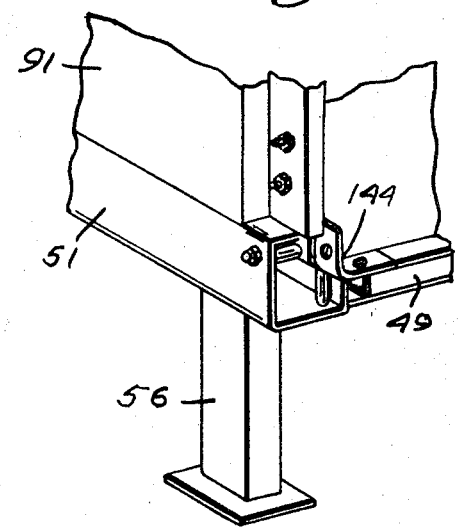
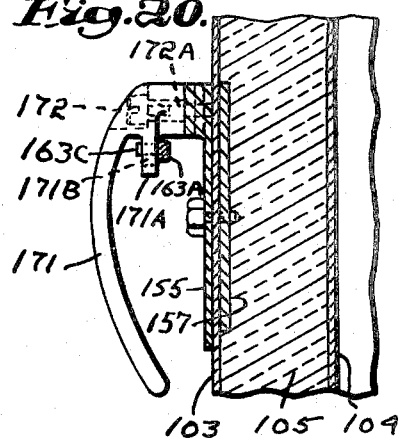
Inventor:
Raymond D. LaPan,
by [signature]
Attorney

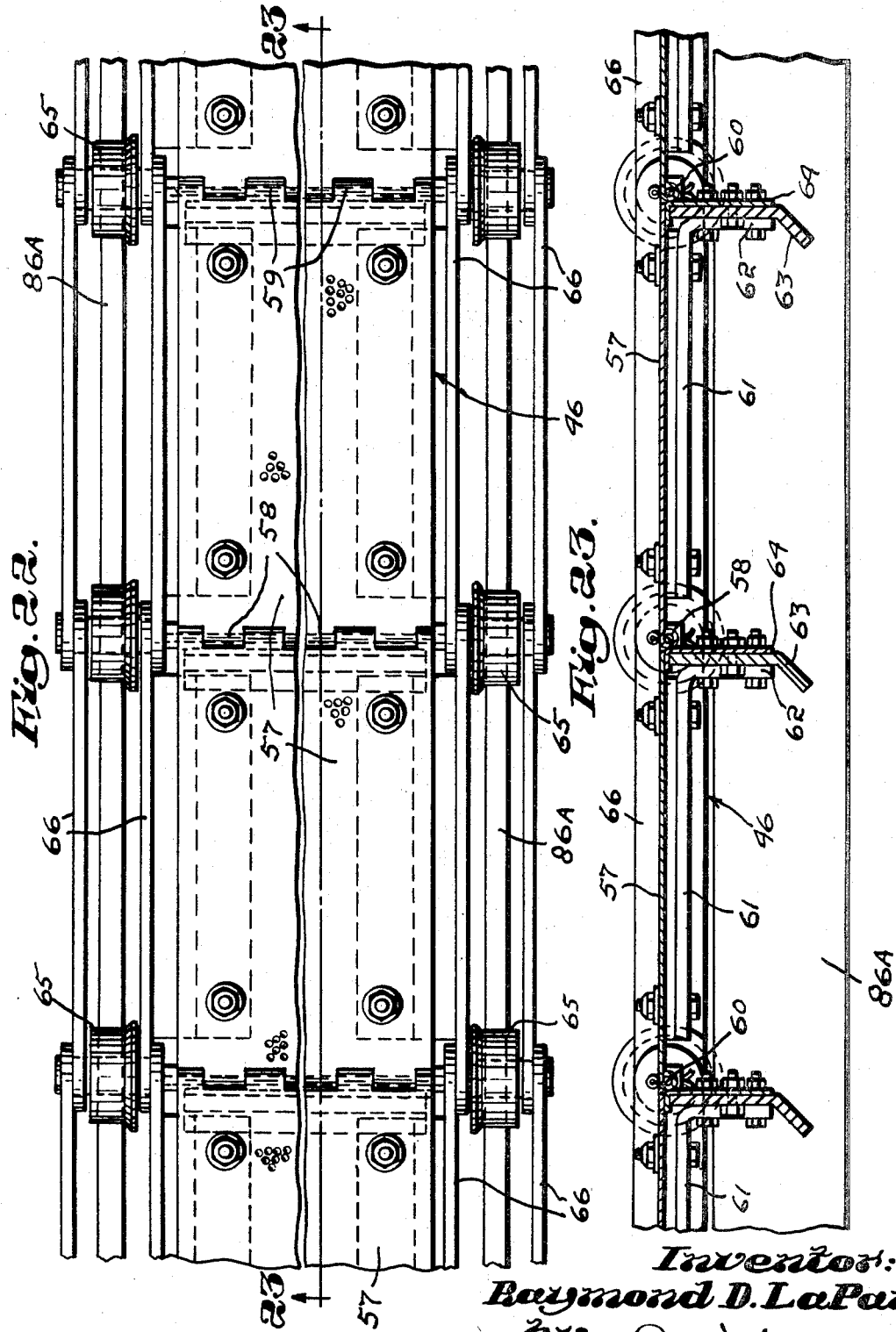

Sept. 24, 1968
R. D. LA PAN
3,402,481
DRIERS AND COMPONENTS THEREOF
Filed Sept. 24, 1965
16 Sheets-Sheet 14
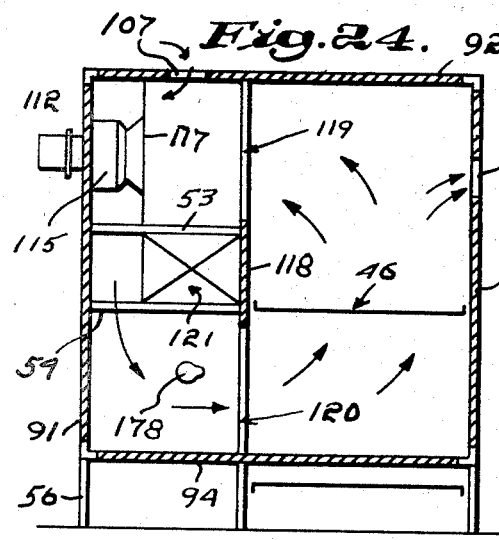
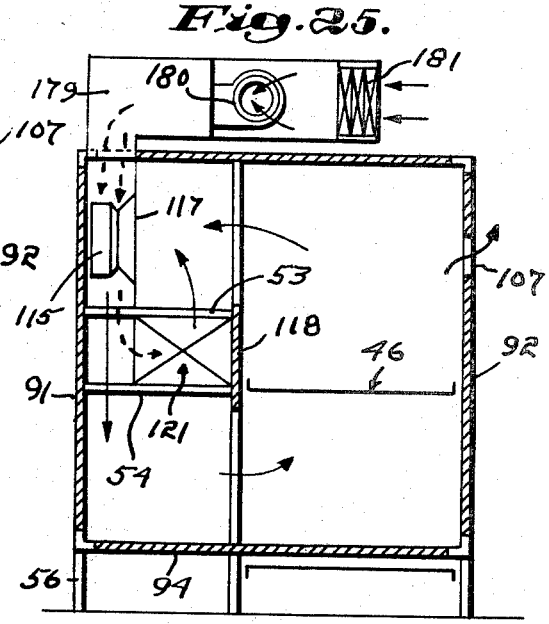
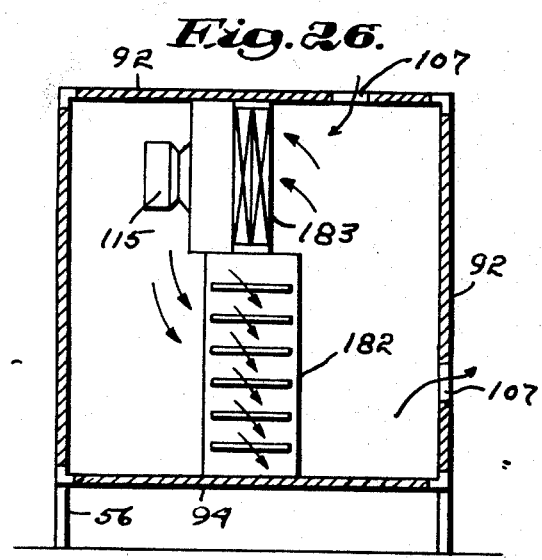
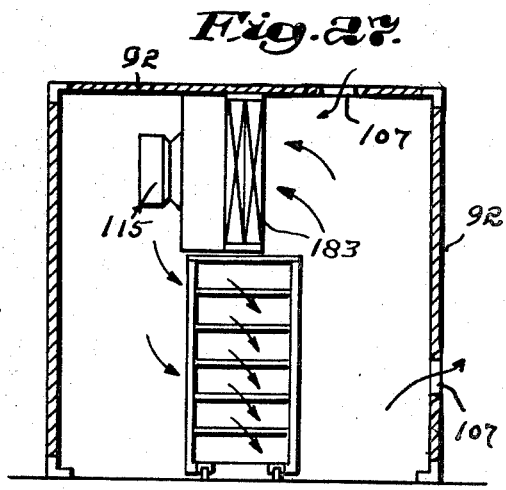
Inventor:
Raymond D. LaPan,
by
Attorney Sept. 24, 1968        R. D. LA PAN        3,402,481
DRIERS AND COMPONENTS THEREOF
Filed Sept. 24, 1965        16 Sheets-Sheet 16

Inventor:
Raymond D. LaPan,
by Abbott Spear,
Attorney

United States Patent Office 3,402,481
Patented Sept. 24, 1968

3,402,481
DRIERS AND COMPONENTS THEREOF
Raymond D. La Pan, Graniteville, Mass., assignor to C. G.
 Sargent's Sons Corp., Graniteville, Mass., a corporation
 of Massachusetts
Filed Sept. 24, 1965, Ser. No. 489,818
23 Claims. (Cl. 34—216)

ABSTRACT OF THE DISCLOSURE

Driers consisting of a chamber that may be formed by sections with a lengthwise partition dividing the chamber into first and second sides interconnected by top and bottom passages, one side having a conveyor extending therethrough and the other side having blowers and a vertical passage for a port of each blower, the chamber having fan-carrying panels that may be reversed, end-for-end, to shift the rotation of the fan ports to passages, the chamber also having an air passage lengthwise of the second sides and of a frame and panel construction adapted to insure modular, thermally insulated construction.

Figure 7:
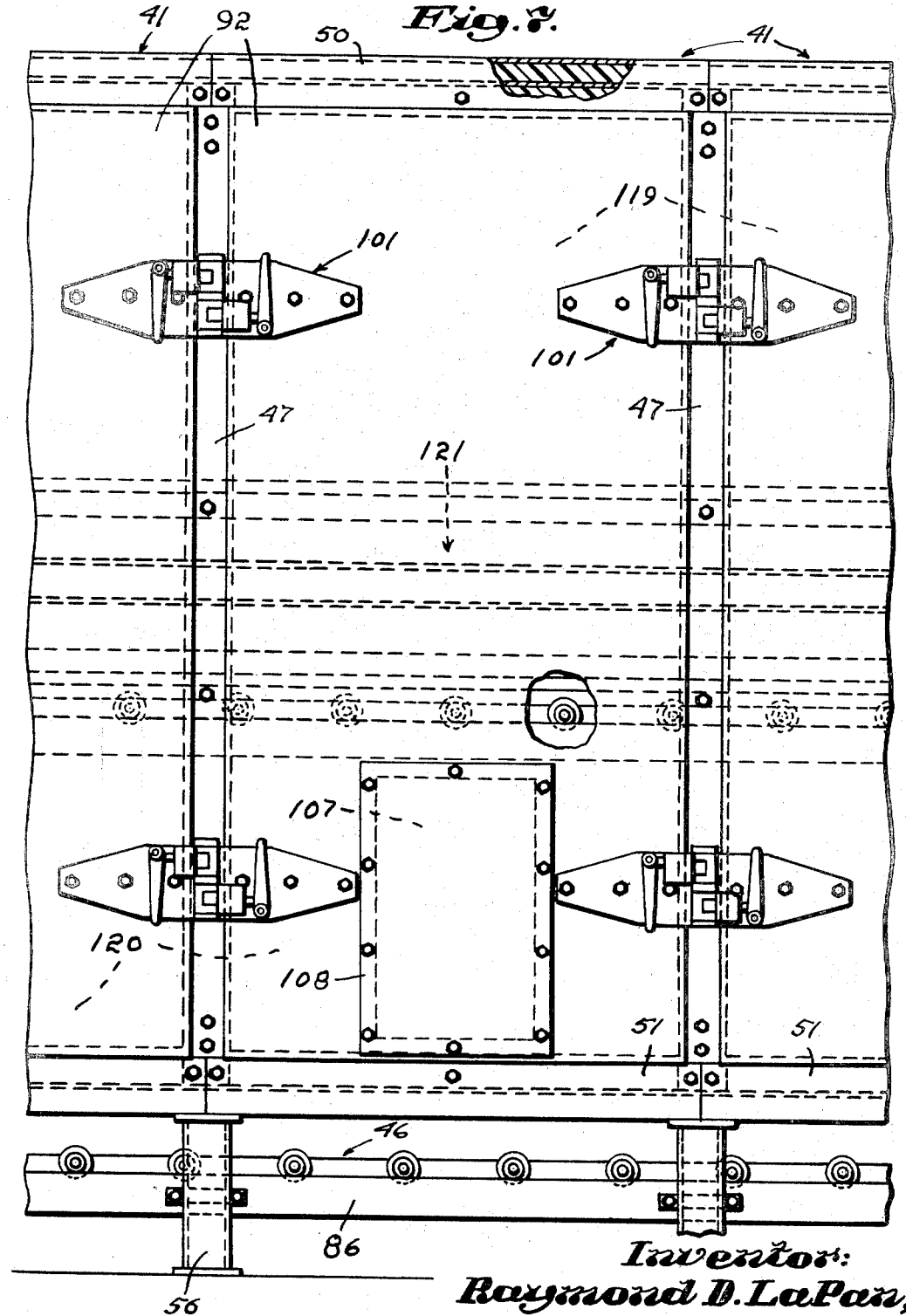

The present invention relates to material treating apparatus such as driers, to the chambers of such apparatus, and to components thereof.

The invention is herein discussed primarily in connection with but is not limited to driers of the type having a treating chamber through which a conveyor extends. Such apparatus is widely used in the treatment of various materials and presents a wide range of problems, with the solution of which the invention is concerned.

Among these problems, material treating efficiency is, of course, of obvious importance while another general objective may be introduced by considering that driers of the type above referred to, are manufactured to meet a customer's requirements as to size, the type of material that must be processed and the amount thereof, and also by the type of treatment that is wanted, including the type and disposition of the heating means that are to be used.

This manufacturing procedure has a number of objectionable features. From the viewpoint of the manufacturer, the necessity of awaiting a customer's order before starting the construction of a drier in a drawback. At the same time, the procedure has the disadvantage to the customer that should his requirements change, or should the treatment for which the drier was designed prove unsatisfactory, then the drier must be substantially rebuilt with attendant high costs and a relatively long period of lost production.

In considering the objectives, novel features and advantages of the invention in more detail, a drier of the type referred to has a drier chamber having a lengthwise vertical partition dividing it into first and second sides and providing passages between the sides adjacent the top and bottom of the chamber. A conveyor has a marginally sealed course extending through the first side between the passages for the support of the material while it is being treated. In the second side, there are a series of fans arranged with their intakes and discharges in communication with the passages thereof and operative to circulate air transversely of the chamber and vertically through the conveyor course.

In accordance with the invention, efficient treating action by the circulating air is attained by so spacing the intakes of the fans relative to the proximate side of the conveyor that air flows through the material thereon with substantial uniformity throughout the width thereof. This result is achieved by recognizing that any fan has a zone wherein air, on its intake side, is appreciably accelerated. If the proximate side of the conveyor is within that zone, the circulating air will be drawn through that side to an extent such that the treatment of the material is not uniform transversely of the conveyor.

This feature of the invention is particularly well adapted for use in driers of the above referred-to type where other features are incorporated that enable driers to be made from stock-piled components and that can be converted to different bases of operation.

Among such features is the provision of means enabling the fans to be mounted in either space and readily moved from one space to another to change the direction of the flow of the circulated air relative to the material supporting course of the conveyor.

Such reversal of the fans makes desirable the use of an air conduit extending lengthwise between the two spaces to supply air to the circulating streams. Such a conduit provides supporting structures for other purposes and, in particular, for the support of a transverse horizontal partition between the fans and the horizontal vertical partition which transverse horizontal partition is necessary with set-back fans, even if other air delivery means are employed.

Reversal of the fans, and, indeed, other conversions of driers or the construction of different types of driers are best effected by providing a drier chamber construction utilizing a framework that provides a series of transversely alined side frames and also top and bottom frames alined therewith. The drier chamber is completed by means of insulated panels detachably attached to the frames in a manner enabling their position to be reversed relative thereto. Some of the panels may carry fans while others may have ports provided with closures but useful in providing chamber inlets or outlets where and when needed.

For the construction of such framework, upright, transverse, and side members are provided that enable driers to be constructed in sections so that drier chamber length as well as internal and external features can be readily varied both during construction and after installation. Such members may be stock-piled with the only variable factor being in the length of the transverse members which is dictated by the required width of the flights of the conveyor. The transverse members may consist of sections tied together as required by the conveyor width.

The use of supporting structure between the two spaces on the second side of the drier chamber has many advantages. When that structure is or includes a lengthwise conduit, the heating means may be outside the drier chamber and readily changed from one type to another and it does not interfere with the use of shrouded or unshrouded heating means elsewhere in the spaces where direct heating is wanted. Additionally, the air conduit may be positioned where desired on the supporting structure. That structure may also be used to support the fans with their axes vertically as well as horizontally, and the interior of the second sides is well adapted to permit other fan supporting structure to be attached thereto.

In the accompanying drawings, there are shown illustrative embodiments of the invention from which the above and other of its objectives, novel features, and advantages will be readily apparent.

Figure 14:
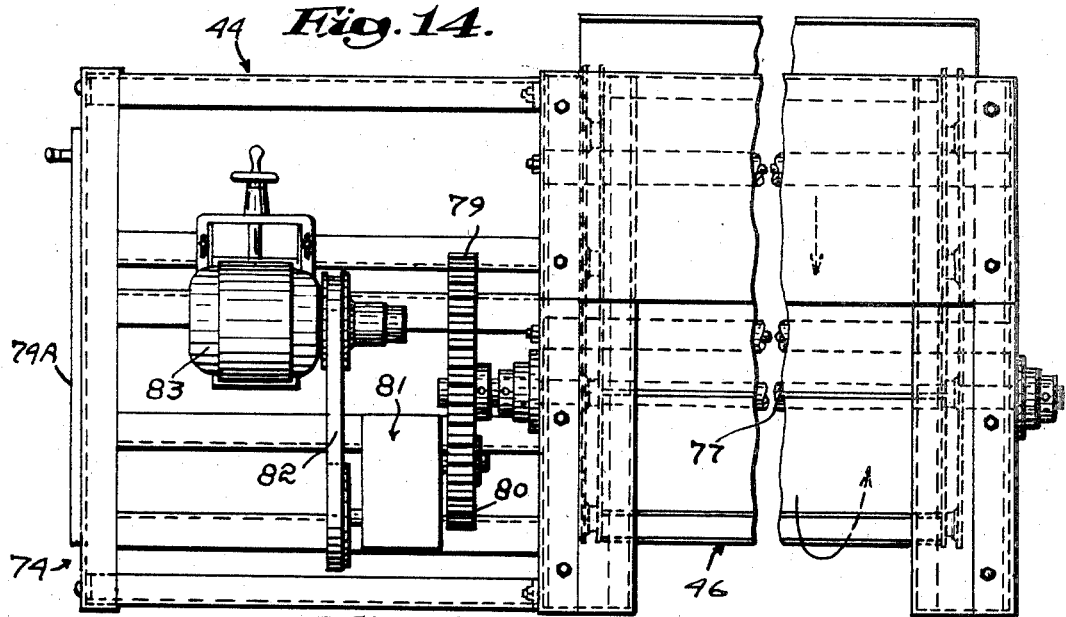
Figure 15:
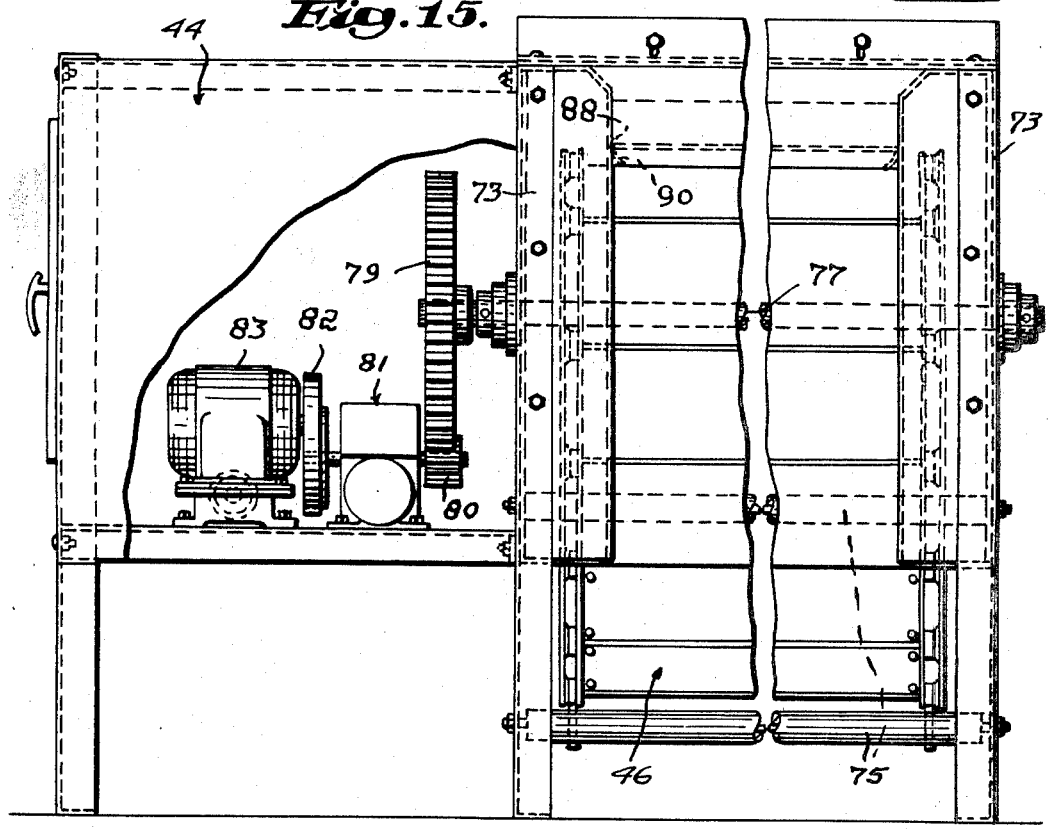

In the drawings:
FIGURE 1 is a top plan view of a drier in accordance with the invention, the drier being transversely broken away to fore-shorten the drawing, FIGURE 2 is a side view thereof, FIGURE 3 is an end view of an end section of the drier, FIGURE 4 is a like view of an intermediate section thereof, FIGURE 5 is a view of the fan side of the outfeed section shown in FIGURE 3, FIGURE 6 is a like view of an intermediate section with the adjacent sections of the drier broken away, FIGURE 7 is a like view but of the conveyor side of the drier and showing a port in a panel, FIGURE 8 is a section approximately along the indicated lines 8—8 of FIGURE 1, FIGURE 9 is a section approximately along the indicated lines 9—9 of FIGURE 8 but with the fan omitted, FIGURE 10 is a side view of the infeed section, FIGURE 11 is an end view thereof, FIGURE 12 is a side view of the discharge or conveyor drive end section of the drier, FIGURE 13 is a view of the opposite side thereof, FIGURE 14 is a plan view of the drive end section, FIGURE 15 is a view of the outfeed end thereof, FIGURE 16 is a fragmentary vertical section through a corner of a section, FIGURE 17 is a fragmentary transverse section through the bottom of a section, FIGURE 18 is a fragmentary section transversely of the drier side wall showing the hinging of two panels to one upright of the framework, FIGURE 19 is a front view of the structures shown in FIGURE 18, FIGURE 20 is a section taken approximately along the indicated lines 20—20 of FIGURE 19, FIGURE 21 is a fragmentary perspective view of the corner of a section, FIGURE 22 is a fragmentary plan view of the conveyor, FIGURE 23 is a section taken approximately along the indicated lines 23—23 of FIGURE 22, FIGURE 24 is a somewhat schematic vertical cross section of a drier showing the inversion of a fan and illustrating different heating means.

Figure 28:
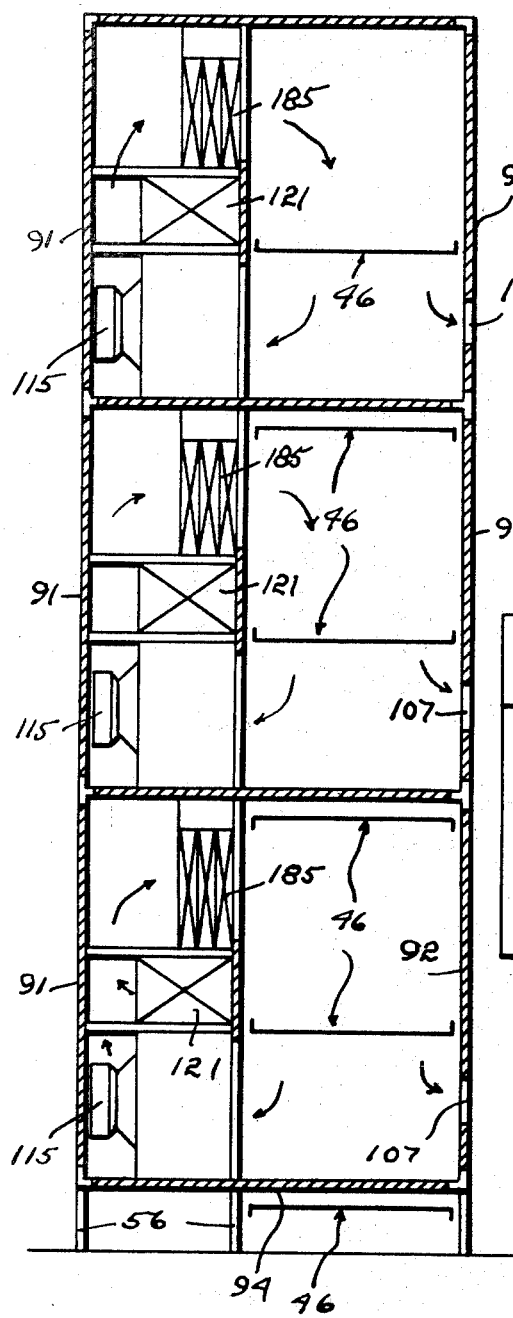
Figure 29:
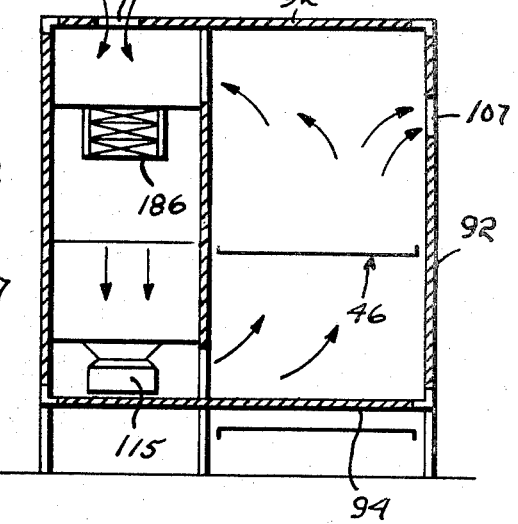
Figure 30:
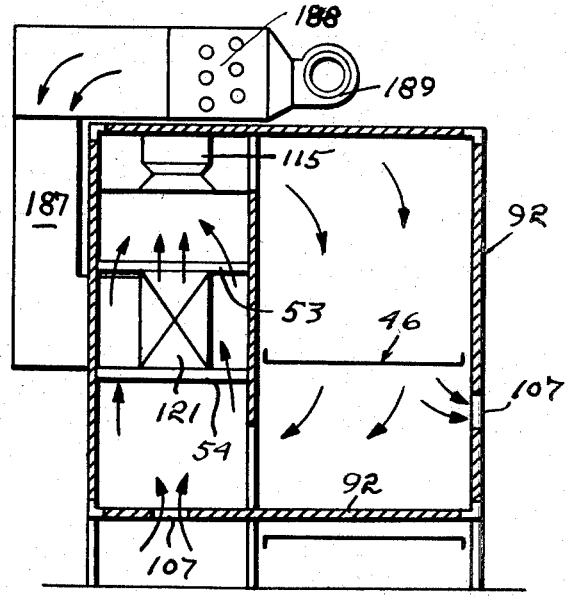
Figure 31:
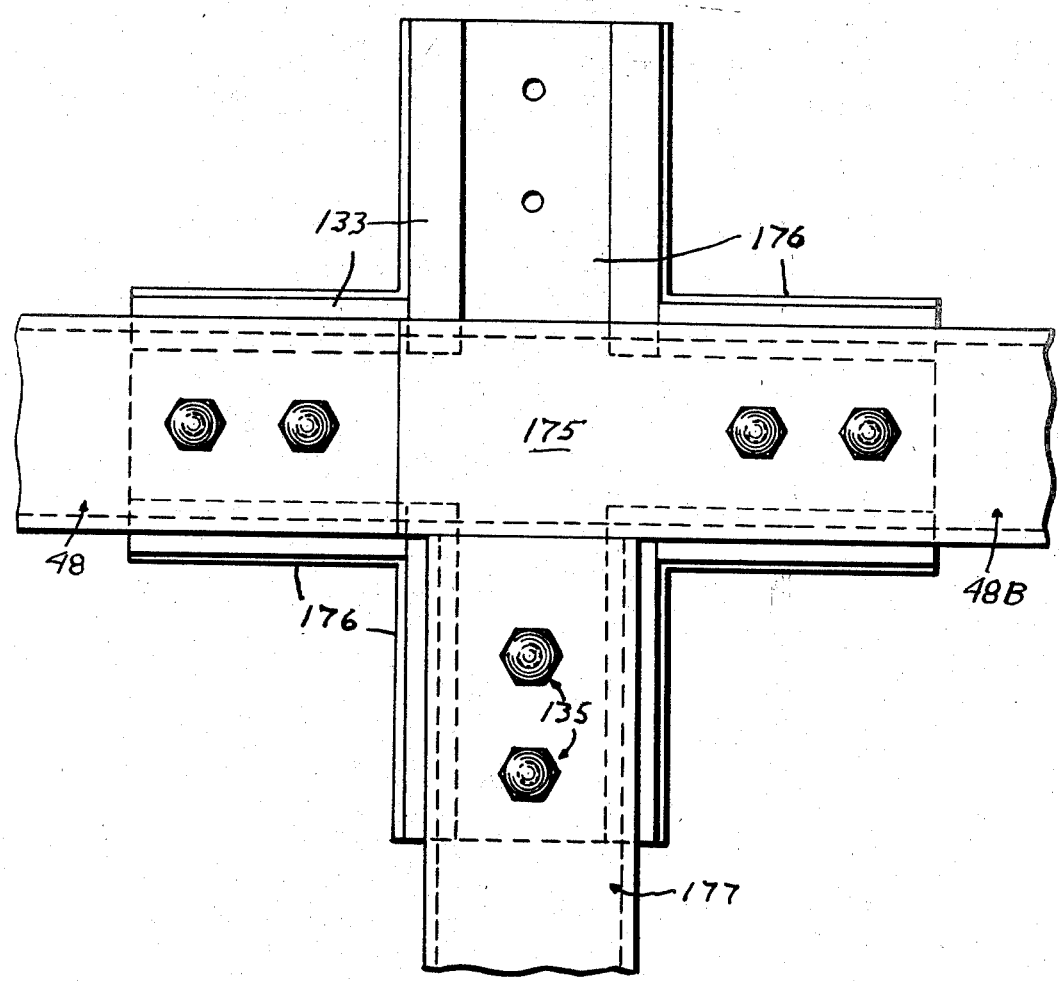
Figure 32:
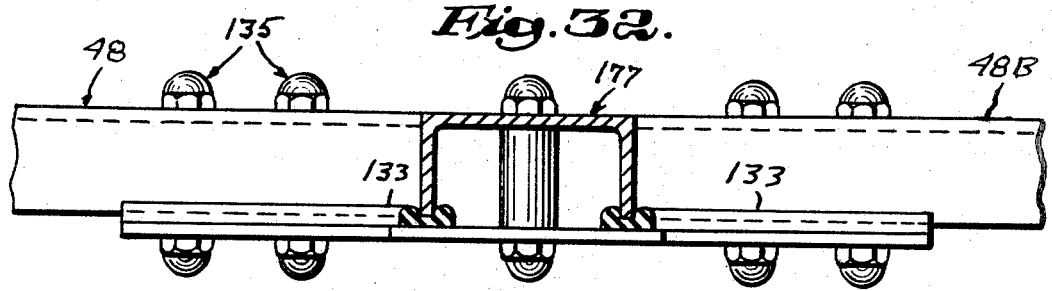

FIGURE 25 is a view similar to FIGURE 24 but with heating means externally of the drier chamber, FIGURE 26 is a like section of a tray drier, FIGURE 27 is a view similar to FIGURE 26 but illustrating a truck drier, FIGURE 28 is a somewhat schematic view illustrating three sections arranged vertically, FIGURE 29 is another schematic view illustrating a fan arrangement in which the fan axis is vertical, FIGURE 30 is a view illustrating schematically yet another embodiment with the fan axis vertical and the air conduit entering laterally into the second side, FIGURE 31 is a fragmentary plan view illustrating the tieing together of transverse members, and FIGURE 32 is a partly sectioned side view thereof.

A drier in accordance with the invention consists of sections, usually several intermediate sections that may be regarded as identical, each generally indicated at 41, generally indicated end sections 42 and 43 differing from the sections 41 primarily in that they have closed end walls, and generally indicated sections 44 and 45 for the support of the outfeed and infeed ends, respectively, of the generally indicated conveyor 46. The sections 41, 42, and 43 establish the drier chamber and the conveyor 46 passes therethrough close to one side, and that side will hereinafter be referred to as the "conveyor" side of the drier, while the other side will usually be called the "fan" side thereof.

The chamber comprises framework consisting of a series of transversely alined pairs of uprights 47 with each pair being interconnected by top and bottom transverse members 48 and 49, respectively. Each two adjacent uprights 47, at each side, are interconnected by top and bottom side members 50 and 51, respectively. The vertically alined transverse members 48 and 49 are interconnected, in an intermediate zone, by a vertical member 52 with the space between it and the conveyor side being for the conveyor 46 and the space at the other side being divided by a pair of parallel, vertically spaced cross supports 53 and 54 extending between the vertical members 52 and the appropriate uprights 47 at the fan side. The cross supports 53 are spaced from the transverse members 48 a distance equal to the spacing of the cross supports 54 from the transverse members 49. The conveyor space is divided by alined transverse members 55, each connecting a vertical member 52 to an upright 47 at the conveyor side of the drier. Legs 56 are secured to the bottom side members 51 under their junctions and near the extremity of each side member 51 at the end of the chamber. Legs are also provided for each transverse member 49 under the vertical member 52 supported thereby.

The thus established framework is characterized by the fact that it presents a series of transversely alined rectangular side frames and vertically alined rectangular top and bottom frames. The framework is rectangular in cross section with its width being variable with the width of the particular conveyor used. The transverse members 48 and 49 may be made in lengths as required or they may be made in sections with one section, for example, being the width required for the conveyor width that is commonly called for thereby to permit the advantage of stockpiling all the framework forming members.

The conveyor 46 is shown, see FIGURES 22 and 23, as of the type consisting of a plurality of foraminous conveyor sections 57, each having a series of eyes 58 spaced along its rear edge and a series of eyes 59 spaced along its leading edge. The two series of eyes are so spaced and dimensioned that the leading eyes 59 of one section fit between the trailing eyes 58 of the next section to receive the pivot 60 by which they are interconnected. Supports 61 are secured to the undersurface of each section 57 adjacent its margins and each of them includes a depending end flange 62 to which is bolted a transverse stiffener 63 and a flanged auxiliary support 64. The supports 61 may also be used for support of stock guides if the marginal sealing means requires them. Each pivot 60 is provided with a roller 65 at each end and is connected, at both ends, to the adjacent pivots 60 by pairs of links 66, one link of each pair being inside and the other side a roller 65.

The end section 45, see FIGURES 10 and 11, which is at the infeed end of the drier and spaced slightly from the adjacent end of the drier chamber section 42, is provided with a pair of idler sprockets 67 mounted on a shaft 68 carried by adjustable supports 69 mounted on the side walls 70 of the end section 45 and enabling the lengthwise tensioning on the conveyor 46 to be adjusted. The side walls 70 are suitably interconnected as at 71 and 72, the interconnection 72 being a transverse member in the plane of the transverse members 55.

The end section 44, which is spaced a short distance from the outfeed end of the drier chamber section 43, has, see FIGURES 12-15, side walls 73 with the wall on the fan side having a housing 74 attached thereto which is provided with a door 74A permitting access to the interior thereof. The walls 73 are interconnected as at 75 and include journals 76 in support of a shaft 77 provided with conveyor driving sprockets 78 and a gear 79. The gear 79 is within the housing 74 and is in mesh with the gear 80 of the generally indicated speed reducing unit 81 having a belt drive 82 powered by the electric motor 84, the motor 83 and the unit 81 being within the housing 74.

Referring now to the framework of the drier chamber, it will be seen that the legs 566 under the conveyor space support rails 86 for the rollers 65 thereby to support the lower course of the conveyor 46, and the rails extending into the sections 44 and 45. It will also be noted that the transverse members 55 and also the transverse member 72 are shown as of stock that is square in cross section and disposed with a corner uppermost. Brackets 85 are slidable on the transverse members 55 and 72 but are locked in desired position thereon by set screws 85A and have rails 86A connected thereto, the rails 86A being for the support of the rollers 65 of the upper course of the conveyor 46 and the adjustable brackets 85 enabling them to be precisely alined.

The marginal sealings of the sides of a conveyor to the sides of the chamber is usually required. While any type of such sealing may be used, stock guides 88 are shown as secured to the uprights 47 and to the vertical members 52 of the chamber, to the side walls 70 of the end section 45, and to the side walls 73 of the end section 44. The stock guides 88 are shown as including channels 89 for flexible seals 90 yieldably engaging both margins of the upper course of the conveyor 46.

The exterior of the drier chamber is completed by attaching panels to the top, bottom and side frames presented by the framework of the sections of the drier chamber and to the end walls of the end sections 42 and 43. The panels for the frames, other than those for the end walls, are of the same dimensions and those for the fan side are indicated at 91, those for the conveyor side at 92, those for the top at 93 and those for the bottom at 94.

The framework of each of the end sections 42 and 43, see FIGURE 3, includes a pair of parallel transverse members 95 and 96, one spaced above and one below the upper course of the conveyor 46. At each end of the drier chamber there are, accordingly, a frame at the end of the fan side closed by a panel 97 and a pair of frames at the conveyor side closed by panels 98 and 99 and defining a conveyor slot 100.

The panels 91 and 92 are shown as attached by hinges, generally indicated at 101, while all of the other panels are shown as detachably secured by generally indicated buttons 102. While the side panels 91 and 92 are of the same size, they differ from each other and from the other panels, and as will be later made apparent, each panel consists, as may best be seen in FIGURES 16–18, of an outer metal wall 103 having inturned marginal flanges 103A and an inner metal wall 104 shown as including marginal side flanges 104A disposed towards the wall 103 and formed with outwardly disposed shoulders 104B having flange extremities 104C and also end flanges 104D, the extremities 104C and the flanges 104D fitting within the flanges 103A and connected thereto as by rivets. The space between the walls is filled with insulation indicated at 105 and between the flanges 103A and the extremities 104C and the end flanges 104D there is an insulating seal 106 minimizing the heat loss via the walls of the panels.

In FIGURE 7, a conveyor side panel 92 is shown as having a port 107 opening therethrough adjacent one end and closed by a removable cover 108. Any or all of the panels 92 may have this feature but as the port 107 is shown as closed, it, while important for reasons which will later be apparent, is an optional one.

Each fan-side panel 91 has a socket 109 adjacent one end backed by the inner wall thereof which has a central opening 110. A bracket 111 is mounted in each socket 109 and has a motor 112 bolted thereto. The motor shaft 113 has the hub 114 of a fan 115 secured thereto, the hub 114 extending into the socket 109 with a seal 116 in engagement therewith. The fan intake plate 117 has marginal side flanges 117A and an end extension 117B extending upwardly between a pair of the cross supports 54.

Partition forming plates 118 are shown as secured to the conveyor side of the vertical members 52, one plate for each section. The plates 118 extend vertically so as to provide openings or passages generally indicated at 119 and 120 between the top and bottom, respectively, of the two sides of the drier chamber, one above and one below the upper course of the conveyor 47.

Between the supports 53 and 54 and backed by the plates 118 is a generally indicated conduit 121 consisting of sections, one conduit section for each drier section, see FIGURE 5, and each joined to the next adjacent drier section as by a sleeve 121A. The conduit 121 is shown as approximately square in cross section with flanges 121C along its fan-side disposed towards but spaced from each other. Upper and lower front wall portions 122 are bolted to the flanges 121C and are shown as having their adjacent edges outwardly flared and space apart to provide an outlet slot lengthwise of the drier chamber. The extensions 117B of the fan intake plates 117 may be bolted to either flange 121C, in FIGURES 3 and 4, to the lower of the flanges. It will be noted that the conduit 121 is spaced from the fan-side of the drier chamber to provide a passageway 123 effecting the only means of direct vertical communication between the space below the support 53 and the space above the support 54.

At each side of each fan, there is a partition 124 bolted to a side flange 117A of a plate 117, the partitions 124 serving to minimize interference of the fans with each other.

The conduit 121 is shown as having a gas burner unit 126 extending from end-to-end thereof and supplied with a mixture of air and gas delivered by the blower-mixing unit 127 through the pipe 128, see FIGURES 1 and 2, and a blower 129 is operative to deliver air into the conduit 121 through the port 130.

With the drier as thus far described, material placed on the conveyor 46 at the infeed end thereof is conveyed through the drier chamber and discharged from the outfeed end of the conveyor 46. While being conveyed through the drier chamber, the material is subjected successively to the fluid streams from each fan, each stream passing into the upper part of the fan-side of the chamber via passageway 123 wherein it is modified by heated air from the conduit 121, into the upper part of the conveyor side thereof through an opening 119, downwardly through the upper course of the conveyor 46 and the material thereon, into the lower part of the conveyor side and thence to the intake side of the fan via an opening 120. It will be appreciated that while the conduit 121 is shown as being supplied by a single unit 127, this arrangement is more or less schematic as there may be a series of blower spaced lengthwise of the conduit 121 and in communication therewith, and, alternatively, the sections of the conduit 121 may be separate. The particular arrangement depends on the number of drier chamber sections and the arrangement that ensures the best heating conditions thereof.

While, in general, it is old in the art to circulate heated air vertically through a conveyor to treat material being carried thereby, a problem has existed in that the material was not treated uniformly transversely of the conveyors. It will be seen that each fan 115 is spaced a substantial distance to one side of the conveyor chamber. This distance is such that each fan will have its "zero" zone spaced to have a "zero" effect on the material thus ensuring that air passing through the material is not so accelerated by the fans as to cause it to flow through the material more rapidly and in greater volume at the side nearest the fans than at the other side of the conveyor, thereby maintaining uniformity in material treatment transversely of the conveyor 46.

From the foregoing, it will be apparent that, since the sections 41 are identical, driers of any length may be provided with appropriate changes in conveyor lengths made necessary by the additional sections 41 and by whatever change in the air delivery of heating means that is necessary to ensure the desired material treatment.

In addition, a drier may be quickly and easily assembled because it is made from parts that may be stockpiled and any section of a completed drier may be readily converted from, for example, down-draft drying, as provided by the apparatus described, to up-draft drying. For example, a panel 91 may be removed and the then exposed intake plate 117 removed and mounted in the space above the support 44. To accomplish this, the plate 117 is inverted and its extension 117B attached to the upper flange 121C of the air conduit 121. The partitions 124 are also removed and re-attached to the plate flanges 117A of the relocated plate 117. By inverting and re-seating the removed panel 91 against its frame, the fan 114 is now in a position to effect a reversal of the air flow relative to the upper course of the conveyor 46.

Reference is now made to the construction of the various members of which the framework is formed. In this connection, it will be noted that the framework at the outer end of the end sections 42 and 43 is slightly different as will presently be explained. The uprights 47, the vertical member 43, and the transverse members 48 and 49 are all identical in cross section and the supports 53 and 54 and the transverse members 95 and 96, may also be of the same construction, so that a description of one of the uprights 47 will suffice and reference is made to FIGURE 17 in which an upright 47 is shown as including a length of channel member 131 with the edges of its sides disposed towards a rear wall 132 which is somewhat wider than the channel member 131 thereby to provide the upright 47 with marginal flanges 132A. The channel member 131 and the wall 132 are clamped together against interposed seals 133 each having a channel 133A for the edge of a side of a channel member 131 and a marginal portion 133B overlying one of the flanges 132A for engagement by the panels, the clamping means being generally indicated at 134. This construction provides a dead air space and avoids thermal contact between inner and outer surfaces.

The clamping means 134 are shown as of different sizes both including a cylindrical ceramic body 135 having a threaded member 136 axially embedded in one end thereof and extending through the wall 132 with a nut 137 threaded thereon. A threaded member 138 or 138A is axially embedded in the other end of the body 135 and extends outwardly through the channel member 131 and has a nut 139 threaded thereon with the longer threaded members 138A being used to detachably support the panel-anchoring buttons 102 by means of nuts 140.

The side members 50 and 51 are identical so that a description of member 51 will suffice. As may best be seen in FIGURES 16 and 21, each member 51 includes an outer corner wall 141 having ends 141A turned inwardly at an angle of 90° relative to each other and an inner, rounded corner wall 142 dimensioned to provide flanges 142A exposed beyond the extremities of the ends 141A. Seals 133 are caught by generally indicated clamping means 143 between the ends 141A and the inner wall 142 with their marginal parts 133A overlying the flanges 142A for engagement by the margins of the panels. The clamping means 143, except for the length of their ceramic bodies are identical to the clamping means 134 and are, accordingly, not described in detail.

At one end of each member 50 or 51, there is secured a longitudinally projecting corner plate 144 as by the clamping means 143 by which that side member is connected to the other end of another corresponding side member. Each corner plate 144 includes portions 144A and 144B disposed at right angles to each other, one for an upright 47 and the other for a transverse member 49, and connected thereto as by a clamping means 137.

It will be noted that construction in accordance with the invention is one in which heat loss through the walls of the drier chamber is held to a minimum. It is also necessary to minimize heat loss at the ends of the chamber. Each of the side members 50 and 51 at the outer ends of the end sections 42 and 43 has a rectangular end cap identified in FIGURE 3 by the suffix addition A to the reference numeral for the side member to which it is attached. For such attachment, each end cap has a tie plate 144A for connection with the tie plate of the side member and to the uprights 47A and the top and bottom transverse end members 48A and 49A. The uprights 47A and the members 48A and 49A are identical to the side members 50 and 51 to which they are connected in the same manner as the other uprights and transverse members. The uprights 47A and the members 48A and 49A thus provide suitably flanged, panel-receiving frames at the infeed and outfeed ends of the drier chamber.

As has been pointed out, the sections 44 and 45 are spaced slightly from the ends of the drier chamber as required to permit chamber expansion as it heats up. The end wall of the end sections 42 and 43 are closed except for the conveyor slots 100 with heat loss further restricted as by shields 145, 146, and 147 at the infeed end and like shields 148, 149, and 150 at the outfeed end.

It has been pointed out that the side panels are attached by generally indicated hinges 101. These are used to attach each side panel along either one or both edges to the uprights defining the sides of its frame and are also useable as latches.

Each hinge 101, as may best be seen in FIGURES 18–20, includes a pintle 151 attached to a plate 152 by end supports 153 and by an intermediate support 154 spaced equally from the end supports and dividing the pintle 151 into upper and lower portions. Each plate 152 is secured to an upright 47 as by clamping means 137.

Each hinge 101 also includes a pair of plates 155, one for each adjacent side panel and shown as including upper and lower portions defined by the center line along which are disposed screws 156 by which it is attached to the outer panel wall, the screw 156 extending into a backing plate 157. Each plate 155 has an outwardly disposed end flange 158, at one side of its center line, terminating in an inwardly opening, arcuate channel 159 dimensioned to fit, when the side panel to which it is attached is in place, between the intermediate support 154 and one of the end supports 153 and against the portion of the pintle exposed therebetween.

Each plate 155 has, on the same side of its center line as the flange 158, a housing 160 within which there is a guide 161 provided with a bushing 162 slidably supporting a pin 163 in transverse alinement with a passageway 164 in the flange 158 and engageable with the pintle 151. The pin 163 has an end portion 163A and an intermediate portion 163B threaded to receive a nut 165 and a nut 166.

The threaded portion 163B extends through a coiled compression spring 167 resiliently bearing against the nut 165 by which its tension may be adjusted and against the guide bracket 168 which is shown as secured to a boss 169 as by screws 170. The pin 163 is thus yieldably urged into engagement with the pintle 151 when the panel is in place, otherwise outwardly beyond the flange 158 until the nut 166 engages the proximate end of the bushing 162, the nut 166 thus serving as an adjustable stop. The bracket 168 has an opening through which the pin end portion 163A extends.

A handle 171 is held by a screw 172 on a pivot pin 172A threaded into the boss 169. The handle 171 has a depending arm 171A having a slot 171B confining a stud 163C on the free end of the pin end portion 163A. With the hinges shown in the drawings, the handles 171 are yieldably held in a vertical position by the springs 167 but may be swung manually towards a horizontal position to retract the pins 163 from their operative, pintle-engaging position.

It will be noted that the pintle-engaging end of each pin 163 has a recess arcuate with respect to the pintle 151 and providing shoulders 173 and 174 with the shoulder 173 shorter than the shoulder 174 and terminating short of a vertical plane axially of the pintle 151 and at right angles to the upright 47 when the panel is in its closed position.

With a side panel mounted at both sides to uprights 47, the hinges 101 at either side may be released to function as latches with the hinges at the other side then being operative to permit that panel to be swung open. A side panel may be released by releasing the hinges 101 at both sides.

It will be appreciated that the disposition of the shoulders 173 relative to the pintles 151 enables the pintles 151 to cam the pins 163 out of their operative positions as when a panel is swung shut, or, when shut, if the pressure builds up in back of a panel to a predetermined extent as is desired, in some cases, in case where an explosion might occur within the drier chamber. It will also be appreciated that adjustments of each nut 166 enable the operative position of the pins 163 to be precisely set, while adjustments of each nut 165 enable the resistance of each spring 167 to movements of the associated pin to be controlled to ensure the desired operation.

It will be noted that in order for two side panels to be connected to the same upright 47, the pintle-engaging pins 163 of the two plates must be located one higher than the other. With the plates shown in the drawings, one is inverted and reversed relative to the other to permit this arrangement but because of the size and shape of the hinge plates, a balanced appearance is achieved.

In addition to the features thus far discussed, it should be noted that an often encountered problem is presented by structural changes desired, for one reason or another, or changes from one type of circulation to another.

The variables in construction are of two types. One type is in the type and location of the means for heating the circulating air. The other type is a dimensional change dictated by the width of the conveyor that is to be used. Conveyor widths vary widely and while the transverse components of the framework may be made in appropriate lengths for all such conveyor widths, it is preferred to stock pile such components in lengths that include the most commonly used conveyor widths and then cut or tie them together or both as required by the conveyor width. Desirably the transverse components provide frames of the size of the frames for the side panels.

The framework may, accordingly, be square in cross section and it is obvious that the width may be decreased by shortening such transverse components. In FIGURES 31 and 32, there is shown a tie plate 175 for extending such components. The tie plate is shown as having four right angularly disposed tie arms 176 having marginal sills 133, two alined tie arms 176 joining together as by clamping members 135, a transverse member, a member 48, for example, and a transverse member 48B of a length providing the desired chamber width. The other alined tie arms 176 are for longitudinal top and bottom, frame-completing members, the top members 177, for example. The members 177 are of the same construction as the uprights 47 and the top and bottom members 48 and 49 and are also connected to the tie plate 175 by clamping member 135. By this construction, conveyor widths may be varied as desired with a minimum of special panel sizes being required.

The conversion of a drier chamber section from down-draft drying to up-draft drying has already been discussed and is illustrated somewhat schematically by FIGURE 24 which corresponds to FIGURE 4. This view also illustrates the inversion of a conveyor side panel 92 and the opening of its port 107 to function as an exhaust port. Had that panel not been inverted but its port opened, an air inlet would have been provided. In addition, FIGURE 24 also illustrates a heater, a gas heater 178 in the lower fan-side space rather than in the air conduit 121. The top panel 93 has been replaced by a panel 92 with its port 107 serving as an air inlet. The conduit 121 thus serves only as supporting structure for the fan.

In FIGURE 25, the same general arrangement as shown in FIGURE 24 is illustrated but with a different source of heated air. In this drier chamber, a conduit 179 extends downwardly through the top panel 93 and opens into the conduit 121. The conduit 179 includes a blower 180 and a heater 181 which may be of a gas, electric, oil, or steam type.

Another advantage of the construction illustrated by the invention is that different types of driers may be formed with the components previously described. For example, in FIGURE 26 there is shown a drier chamber of the same cross sectional shape having a tray support 182 and a fan 115 with a heater 183. The port 107 of the panel 92 on the conveyor side is now used as an outlet or exhaust port and a like panel 92 has its port 107 disposed as an air inlet. In FIGURE 27, a similar arrangement is shown but the chamber legs 56 and the bottom panels 94 are omitted and the tray support 184 is of the truck type.

FIGURE 28 illustrates a drier chamber with vertically stacked drier chamber sections 41A. These sections are generally similar to the sections 41 except that the external source of heated air is eliminated from each section and a heater 185 is disposed in the upper space in the fan side to condition air passing through the passages 119 for down-draft drying. The ports 107 in the conveyor side panels 92 are used for exhaust ports.

FIGURE 29 illustrates a somewhat different chamber having much the same framework, but with a different arrangement shown as providing up-draft drying relative to the conveyor 46. The top panels are panels 92, each having its port 107 providing an air inlet and the side panels 92 each has its port 107 adjacent the upper end of the chamber and providing an outlet port.

From the foregoing, it will be apparent that the invention affords a wide range of novel features and advantages in the construction and operation of material treating apparatus involving the circulation of air.

I claim:

1. In apparatus for treating material, a chamber including a lengthwise vertical partition dividing it into first and second sides and providing passages between said sides adjacent the top and bottom of the chamber, a conveyor including a marginally sealed course extending through said first side between said passages for the support of material while being treated, a series of fans spaced along and wholly within said second side with their axes horizontal and each fan having its intake substantially in transverse alignment with and in communication with a passage and its outlet disposed in a vertical direction towards and in communication with the opposite passage thereby to circulate air transversely of said chamber and vertically through said course each fan being so spaced from said lengthwise partition as to have its zero intake zone located in said second side to insure that the air flows through the material on said course with substantial uniformity throughout the width thereof.

2. The apparatus of claim 1 in which the axes of the fans are perpendicular.

3. In apparatus for treating material, a chamber including a lengthwise, vertical partition dividing it into first and second sides and providing passages between said sides adjacent the top and bottom of the chamber, a conveyor including a marginally sealed course extending through said first side between said passages for the support of material being treated, a series of fans spaced along said second side with their intakes and discharges in communication with said passages thereof to circulate air transversely of said chamber and vertically through said course, and a fluid conduit extending lengthwise of said second side adjacent said partition and opening into said second side into the stream of air circulated by said fans on the outlet side thereof, and means to deliver fluid under pressure through said fluid conduit.

4. The apparatus of claim 3 in which there is a heater unit within and extending lengthwise of the air conduit.

5. In apparatus for treating material, a chamber including a lengthwise vertical partition dividing it into first and second sides and providing passages between said sides adjacent the top and bottom of the chamber, a conveyor including a marginally sealed course extending through said first side between said passages for the support of material while being treated, a series of fans, a vertical passage in said second side between the upper and lower ends thereof defining vertically separated spaces with which the vertical passage is in communication and which are in communication with the appropriate one of the partition passages, means to support each fan in said second side in either of said vertically separated spaces with its inlets disposed towards the first side and its outlet in communication with the vertical passage thereby to circulate air transversely of said chamber and vertically through said course in one direction and through said vertical passage in the opposite direction, said vertical direction being reversed by shifting the fans from one of the vertically separated spaces to the other.

6. In apparatus for treating material, a chamber including a lengthwise partition dividing it into first and second sides and providing passages between said sides adjacent the top and bottom of the chamber, a conveyor including a marginally sealed course extending through said first side for the support of material while being treated, transverse supporting structure dividing said second side into upper and lower spaces of the same size and including a series of horizontal transverse partitions abutting said vertical partition and providing a passage between the spaces remote from the first side, a series of fans spaced along said second side, each fan in a space with its intake and discharge disposed to effect the circulation of air via said passages transversely of said chamber and vertically through both sides, said chamber including a series of detachable panels, one for each fan and supporting it, each panel having two positions, one inverted relative to the other, in one position, the fan being in the lower of said spaces and in the other position, the fan being in the upper of said spaces and inverted thereby to effect a reversal of the air flow relative to said course, and a series of plates, one for each fan and having an intake port, each intake port plate providing a vertical partition lengthwise of the space in which the fan for which it provides an intake is located, said intake port partitions abutting said horizontal partitions.

7. The apparatus of claim 6 in which the supporting structure includes two series of vertically spaced transverse supports and a conduit between the supports which establishes the transverse partition and has an opening into the passage between the spaces.

8. The apparatus of claim 6 in which the supporting structure includes two series of vertically spaced transverse supports, and a conduit between said supports has an outlet opening into the passage between the spaces, the conduit including mating sections.

9. The apparatus of claim 6 in which the supporting structure includes two series of vertically spaced transverse supports, and a conduit between the supports establishes the transverse partition, the conduit including a vertically spaced pair of flanges adjacent the passage between the spaces, and the intake port plates are attached to the flange proximate to the space in which it is located.

10. The apparatus of claim 6 in which there is a series of transverse vertical partitions, one between each two adjacent fans and abutting said intake plates.

11. In apparatus for treating material, a chamber including transverse top, bottom and upright members and top and bottom side members interconnected to establish a series of transversely aligned, rectangular frames along each side, a series of vertically aligned top and bottom frames, each between corresponding side frames, the side frames being of the same size and the top and bottom frames being of the same size, and panels, each panel including inner and outer metal walls thermally insulated from each other, said frames and said panels including interengageable, marginal seat portions and releasable means detachably locking said panels to said frames, the outer wall of each panel including inturned marginal flanges, the inner wall including outwardly disposed, marginal shoulders along opposite sides and extremities, said marginal flanges and said extremities fitting one within the other and being interconnected, a seal of stock that is a poor thermal conductor between said interconnected flanges and extremities, and a filler of a thermal insulation confined between said walls.

12. In apparatus for treating material, a chamber including transverse top, bottom and upright members, and top and bottom side members, said members being interconnected to establish transversely alined, rectangular frames along each side, a series of vertically alined rectangular top and bottom frames, each between corresponding side frames, the side frames being of the same size and the top and bottom frames being of the same size, one for each frame and seated thereon, said frames and panels including interengageable marginal portions of which one is a flange, releasable means attaching each panel to the framework, and a seal of material that is a poor thermal conductor disposed between each panel and the flanges of its frame.

13. The apparatus of claim 12 in which the transverse top, bottom, and side members are all of the same length.

14. The apparatus of claim 12 in which the flanges are part of each panel.

15. The apparatus of claim 12 in which the uprights and transverse member each comprise an outer part in the form of a length of stock of U-shaped cross section, an inner part in the form of a flat strip of sufficiently greater width than the outer part to provide the inset flanges, each seal includes a portion between an edge of the outer part and the inner part, and a portion overlying an inset flange, and means clamping the parts together.

16. The apparatus of claim 12 in which each side member includes an outer corner part provided with inturned flanges disposed at an angle of 90° relative to each other, and an inner corner part dimensioned to protrude beyond the outer part flanges to provide the inset flanges, each seal includes a portion between an edge of an outer part flange and the inner part and a portion overlying an inset flange, and means clamping the parts together.

17. The apparatus of claim 12 in which each frame member includes an outer part including flanges and an inner part dimensioned to extend beyond each outer part flange to provide the inset flange, each seal includes a portion between an outer part flange and the inner part and a portion overlying the adjacent inset flange, and means clamping the parts together, the clamping means including a ceramic body including a threaded member in each end, each threaded member extending through one of the parts, and a clamping nut threaded on each threaded member.

18. The apparatus of claim 12 in which each side member includes a series of side sections each including an outer corner part provided with inturned flanges disposed at an angle of 90° relative to each other, an inner corner part dimensioned to protrude beyond the outer part flanges to provide the inset flanges, each seal includes a portion between an edge of an outer part flange and a portion overlying the adjacent inset flange, means clamping the parts together, and a tie plate at one end of each section and protruding lengthwise for the attachment of another section thereto and at right angles thereto for the attachment of other frame members thereto.

19. In apparatus for treating material, a chamber including a lengthwise vertical partition dividing it into first and second sides and providing passages between said sides adjacent the top and bottom of the chamber, a conveyor including a marginally sealed course extending through said first side between said passages for the support of material while being treated, means to support said course including a plurality of horizontally alined transverse supports in said first side, a pair of mounts slidably mounted on each transverse support, each including a releasable lock anchoring it thereto, and corner supporting runs extending lengthwise of each said first side and secured to said mounts.

20. The apparatus of claim 19 in which each cross support is square in cross section and is disposed with a corner uppermost.

21. The apparatus of claim 3 and vertically spaced, transverse supporting structures between which the fluid conduit is located and which divides the remainder of the second side into upper and lower spaces of the same size, either space being for a fan.

22. The apparatus of claim 21 and a series of vertically disposed panels for the second side, one panel in support of each fan, the panels closing the second side with each fan in one of the spaces regardless of which panel end is uppermost.

23. The apparatus of claim 22 in which each panel defines with the fluid conduit a vertical passage effecting communication between the spaces.

References Cited

UNITED STATES PATENTS

| | | | |
|---|---|---|---|
| 1,978,341 | 10/1934 | Coleman | 34—213 XR |
| 2,989,809 | 6/1961 | Kurz | 34—213 XR |
| 1,547,294 | 7/1925 | Braemer | 34—231 X |
| 2,346,138 | 4/1944 | Morrill | 34—223 |
| 2,370,422 | 2/1945 | Reed | 34—231 X |
| 2,380,555 | 7/1945 | Scholar | 34—216 X |
| 2,713,213 | 7/1955 | Bogaty | 34—223 X |
| 2,799,096 | 7/1957 | Scott | 34—231 X |
| 2,820,307 | 1/1958 | Bogaty | 34—242 X |
| 3,069,786 | 12/1962 | Nichols | 34—236 X |
| 3,281,958 | 11/1966 | Lambert et al. | 34—216 X |

FREDERICK L. MATTESON, JR., *Primary Examiner.*

H. B. RAMEY, *Assistant Examiner.*